United States Patent [19]
Earl et al.

[11] Patent Number: 5,354,630
[45] Date of Patent: Oct. 11, 1994

[54] NI-H$_2$ BATTERY HAVING IMPROVED THERMAL PROPERTIES

[75] Inventors: Martin W. Earl, Silver Spring; William H. Kelly, Gaithersburg; Wein-Shen Jiang, Germantown; Ronald R. Kessler, Mt. Airy; Fred W. Brantner, Frederick, all of Md.

[73] Assignee: Comsat, Clarksburg, Md.

[21] Appl. No.: 988,670

[22] Filed: Dec. 10, 1992

[51] Int. Cl.$^5$ ............................................. H01M 12/08
[52] U.S. Cl. .................... 429/101; 429/120; 429/154
[58] Field of Search ............... 429/101, 120, 153, 154, 429/155, 164

[56] References Cited

U.S. PATENT DOCUMENTS

| | | |
|---|---|---|
| 4,038,461 | 7/1977 | Warnock . |
| 4,098,962 | 7/1978 | Dennison . |
| 4,107,402 | 8/1978 | Dougherty et al. . |
| 4,324,845 | 4/1982 | Stockel . |
| 4,327,158 | 4/1982 | Holleck ............... 429/155 X |
| 4,546,054 | 10/1985 | Carr et al. . |
| 4,567,119 | 1/1986 | Lim . |
| 4,909,807 | 3/1990 | Klink et al. ........... 429/101 X |
| 4,923,769 | 5/1990 | Jones et al. . |
| 4,957,830 | 9/1990 | Jones . |
| 5,071,652 | 12/1991 | Jones et al. . |
| 5,168,017 | 12/1992 | Jones et al. ................ 429/101 |

FOREIGN PATENT DOCUMENTS 0136769  4/1985  European Pat. Off. .
0340963  8/1989  European Pat. Off. .

OTHER PUBLICATIONS

Earl et al. "Design and Development of an Aerospace CPV Ni/H$_2$ Battery", 24th Intersociety Energy Conversion Engineering Conference, Washington, D.C., Aug. 1989, Proc. vol. 3, pp. 1395–1400.

Dunlop et al., "Making Space Nickel/Hydrogen Batteries Light and Less Expensive", AIAA/DARPA Meeting on Lightweight Satellite Systems, Monterey, Calif., Aug. 1987, NTIS No. N88–13530.

Holleck, "Common Pressure Vessel Nickel-Hydrogen Battery Design", 15th Intersociety Energy Conversion Engineering Conference, Seattle, Wash., Aug. 1980, Proc., vol. 3, pp. 1908–1911.

Zagrodnik, et al. "Nickel-Hydrogen Multicell Common Pressure Vessel Battery Development Update", IEEE AES Systems Magazine, Nov. 1992, pp. 43–48.

Zagrodnik, et al. "Multiple Cell Common Pressure Vessel Nickel-Hydrogen Battery", Journal of Power Sources, 36 (1991), pp. 375–384.

Perez, "Design Considerations Related to Nickel Hydrogen Common Pressure Vessel Battery Modules", American Chemical Society, 1986, pp. 1554–1559.

Primary Examiner—Stephen Kalafut
Attorney, Agent, or Firm—Sughrue, Mion, Zinn, Macpeak & Seas

[57] ABSTRACT

A common pressure vessel type Ni—H$_2$ storage battery having an outer pressure vessel that contains a stack of compartments. Each of the compartments including at least one battery cell, a heat transfer member, and a cell spacer for maintaining a relatively constant distance between adjacent compartments. The heat transfer members include a fin portion, which is in thermal contact with the battery cell, and a flange portion which extends longitudinally from the fin portion and is in tight thermal contact with the inner wall of the pressure vessel. The heat transfer member serves to transfer heat generated from a battery cell radially outward to the pressure vessel, which is capable of dissipating the heat into the surrounding atmosphere.

6 Claims, 6 Drawing Sheets

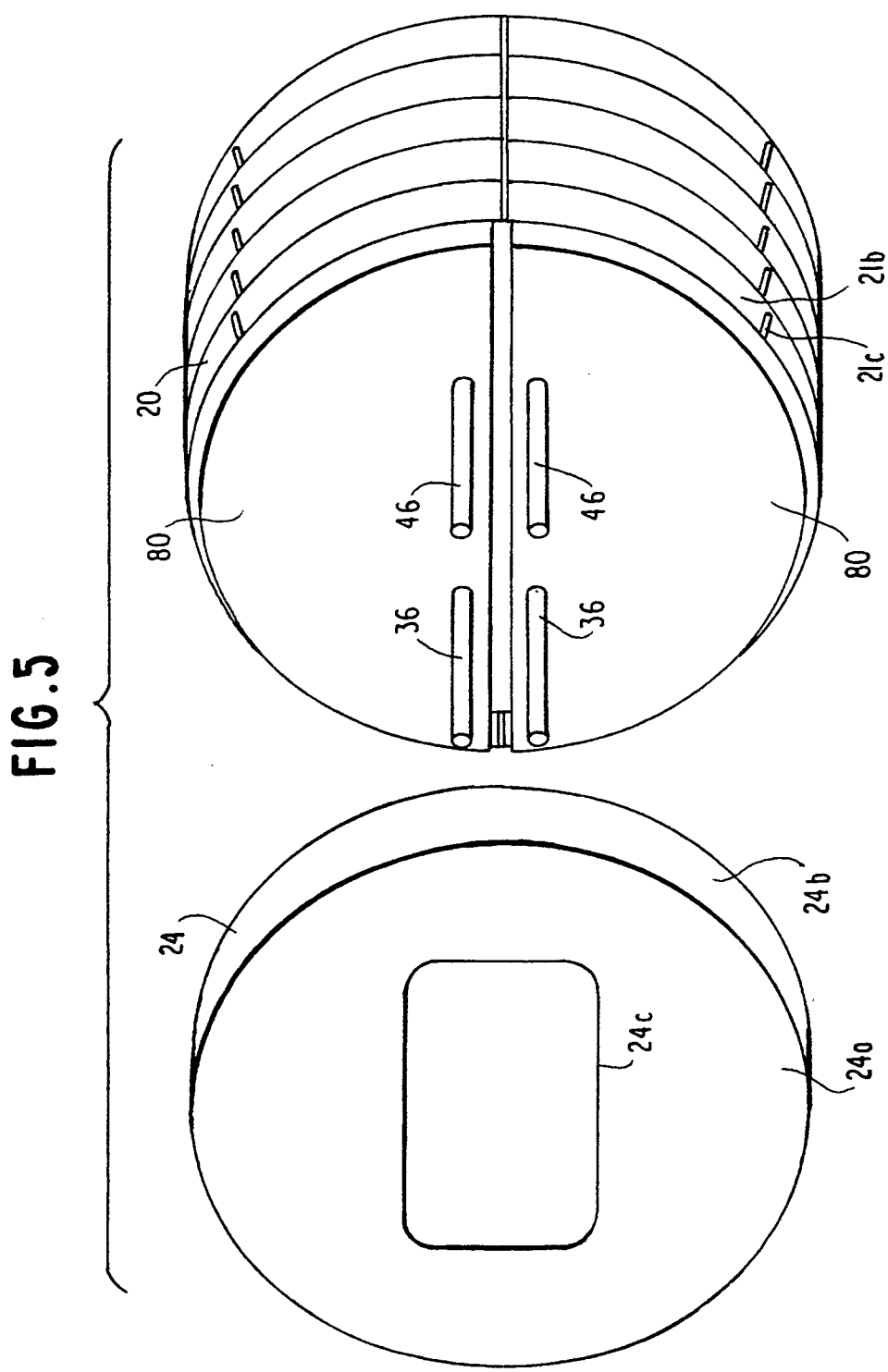

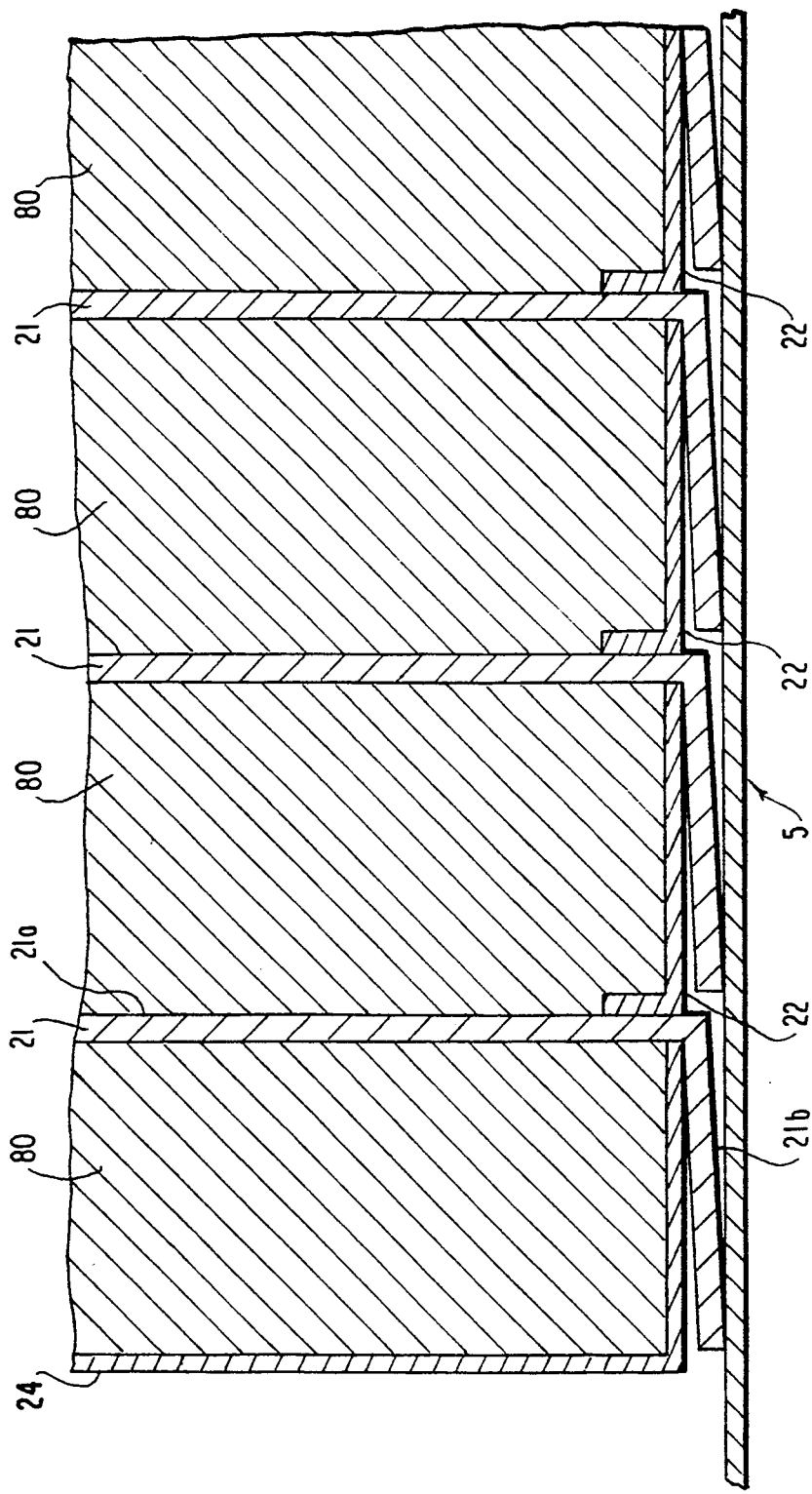

NI-H₂ BATTERY HAVING IMPROVED THERMAL PROPERTIES

BACKGROUND OF THE INVENTION

The present invention relates to a common pressure vessel type Ni—H$_2$ storage battery, which may be used, for example, in powering satellites. More particularly, the invention relates to a common pressure vessel type Ni—H$_2$ storage battery having improved heat transfer properties between individual battery cells of the cell stack and the walls of the pressure vessel of the battery.

The earliest Ni—H$_2$ batteries for satellite application employed individual pressure vessels for each cell in the battery. However, to gain improvements in specific energy and energy density and to reduce the total weight and volume of the battery, the recent trend has been to incorporate multiple cells in a stack arrangement within a single pressure vessel. This type of Ni—H$_2$ battery is termed in the art a common pressure vessel type battery. Examples of common pressure vessel type Ni—H$_2$ batteries are described in the following publications: M. Earl et al., "Design and Development of an Aerospace CPV Ni—H$_2$ Battery", 24th Intersociety Energy Conversion Engineering Conference, Washington, D.C., August 1989, Proc., Vol. 3, pp. 1395–1400; J. Dunlop et al., "Making Space Nickel/Hydrogen Batteries Light and Less Expensive", AIAA/DARPA Meeting on Lightweight Satellite Systems, Monterey, Calif., August 1987, NTIS No. N88-13530; G. Holleck, "Common Pressure Vessel Nickel-Hydrogen Battery Design", 15th Intersociety Energy Conversion Engineering Conference, Seattle, Wash., August 1980, Proc., Vol. 3, pp. 1908–1911; and E. Adler et al. "Design Considerations Related to Nickel Hydrogen Common Pressure Vessel Battery Modules", 21st Intersociety Energy conversion Engineering Conference, San Diego, Calif., August 1986, Proc., Vol. 3, pp. 1554–1559.

In Ni—H$_2$ batteries, considerable waste heat is generated during both charge and discharge portion of cycles. In the conventional common pressure vessel type Ni—H$_2$ battery, the individual cells were generally disposed inside of an insulating carrier. The thermal path between the heat generating portions of the cells and the wall of the pressure vessel was lengthwise through the battery cell stack components and then through the hydrogen gas of the battery to the adjacent wall of the pressure vessel. As a result, the thermal resistance between the individual cells and the pressure vessel was high, resulting in undesirable large temperature increases within the battery.

SUMMARY OF THE INVENTION

It is therefore an object of the invention to provide a common pressure vessel type Ni—H$_2$ battery in which the thermal resistance between the individual cells and the pressure vessel of the battery is greatly reduced, thereby effecting rapid heat transfer between the cells and the pressure vessel and thus allowing the specific capacity of the battery to be increased.

In accordance with the above and other objects, the invention provides a battery including a pressure vessel, and a plurality of compartments disposed in side-by-side relation, each of the plurality of compartments including a heat transfer member having a fin portion and a flange portion extending longitudinally from the fin portion, the flange being in thermal contact with an inner wall of the pressure vessel, and a plurality of battery cells, at least one battery cell being disposed in each of the compartments and in thermal contact with adjacent fin portions of the heat transfer members.

In further accordance with the above and other objects, the present invention provides a metal oxide hydrogen battery including an outer pressure vessel, a plurality of cell modules disposed in side-by-side relation in the vessel, a heat transfer member disposed between adjacent cells modules, each heat transfer member including a generally flat fin disposed between adjacent cell modules and a peripheral flange extending from the periphery of the fin and disposed in engagement with the inner surface of the pressure vessel, the width of the cell modules being greater than the longitudinal length of the flanges whereby the outer end of each flange is disposed out of contact with adjacent heat transfer members, and connecting means for connecting the cell modules and heat transfer members in side-by-side relations as a stack.

Even further, the present invention provides a metal oxide-hydrogen battery composed of an outer pressure vessel including a generally cylindrical metal shell, a plurality of heat transfer members each including a generally flat fin disposed between each pair of adjacent cell modules and having a peripheral flange disposed in engagement with the metal shell, the width of the cell modules being greater that the length of the flanges of the heat transfer members whereby each flange is disposed out of contact with the adjacent heat transfer member, clamping means for clamping the cell modules and the heat transfer members together in side-by-side relations as a stack, and means for permitting the flange to follow radial expansion of the pressure vessel.

Still, even further, the present invention provides a metal oxide-hydrogen battery including an outer pressure vessel, a group of cell modules disposed in side-by-side relations in the pressure vessel, a plurality of heat transfer members, each heat transfer member including a generally flat fin disposed between adjacent cell modules and each heat transfer member including a peripheral flange extending generally longitudinally from the peripheral edge of each fin and disposed in engagement with the inner surface of the pressure vessel, each flange being provided with a plurality of longitudinally extending circumferentially spaced slits, the width of each cell modules being greater than the length of each flange whereby the outer end of each flange is disposed out of contact with the adjacent heat transfer member, and clamping means for clamping the cell modules and heat transfer member in side-by-side relation as a stack.

BRIEF DESCRIPTION OF THE DRAWINGS

FIG. 5 illustrates a stack of compartments with an outer end cell spacer;

FIG. 7 shows an enlarged fragmentary longitudinal section of the battery of FIG. 1 showing a group of compartments including a heat transfer member, battery cell, cell spacer, and end cell spacer;

DETAILED DESCRIPTION OF THE PREFERRED EMBODIMENTS

Preferred embodiments of the invention will now be described with reference to the attached drawings.

Figure 1:
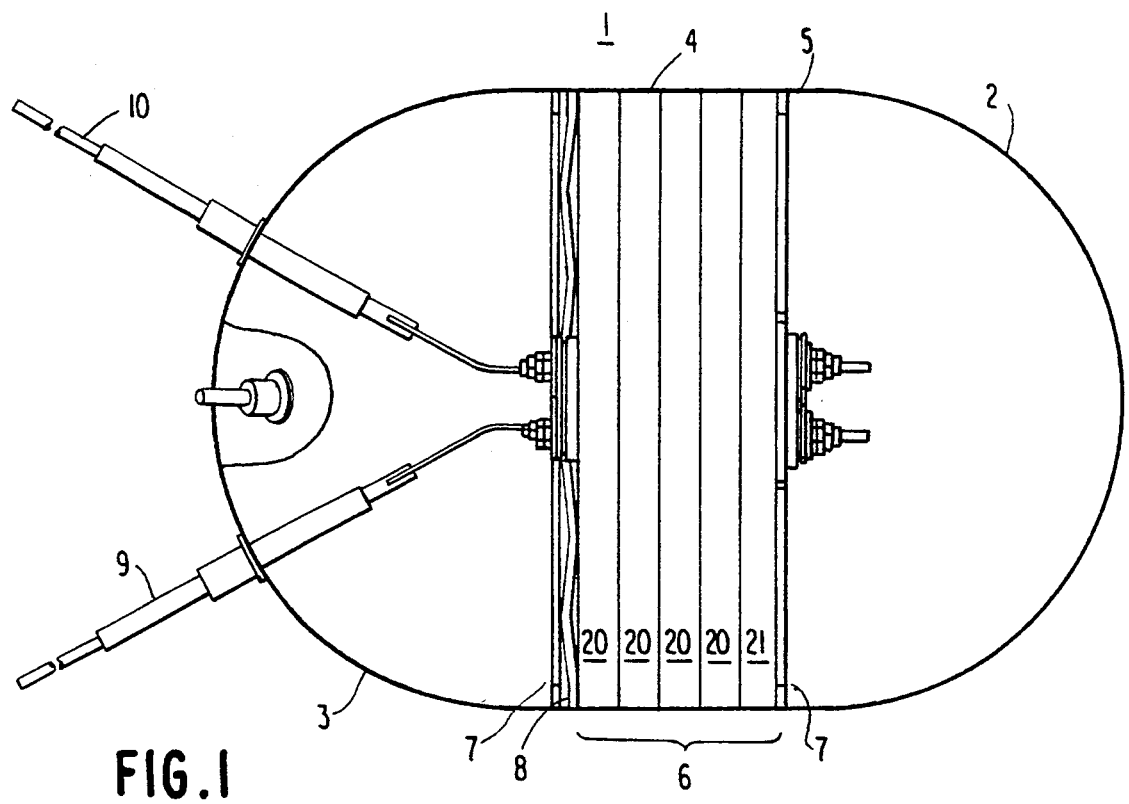
FIG. 1 is partially cut-away cross-sectional view of a common pressure vessel type Ni—H$_2$ battery constructed in accordance with a preferred embodiment of the present invention.

Referring to FIG. 1, a pressure vessel 5 of a preferred embodiment of a Ni—H$_2$ battery 1 of the invention is composed of a central cylindrical portion 4 capped at respective ends by end portions 2 and 3. Within the pressure vessel 5, there is a stack 6 of individual cylindrical compartments 20 disposed in side-by-side relation. The outer wall of the stack 6 of the cylindrical compartments 6 conforms to the shape of the central cylindrical portion 4 such that the outer wall of the stack is in thermal contact throughout its surface with the inner wall or surface of the central cylindrical portion 4 of the pressure vessel 5. As will be described below in more detail, each compartment 20 is composed of at least one battery cell 80, a heat transfer member 21, and a cell spacer 22 or an end plate 24 as shown in FIG. 5.

Figure 2:
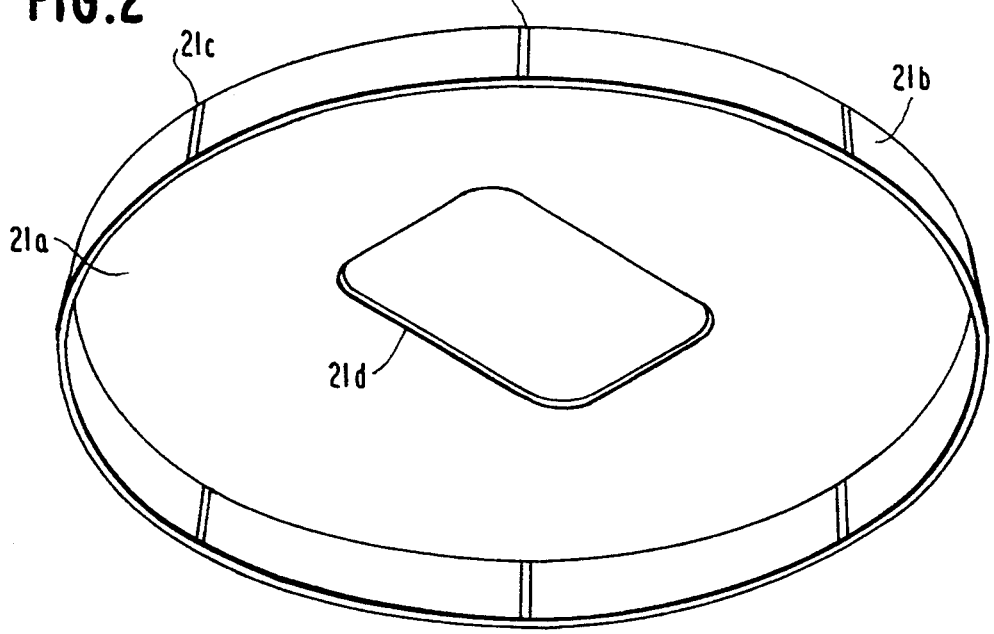
FIG. 2 illustrates a heat transfer member according to a first embodiment of the invention.
Figure 3:
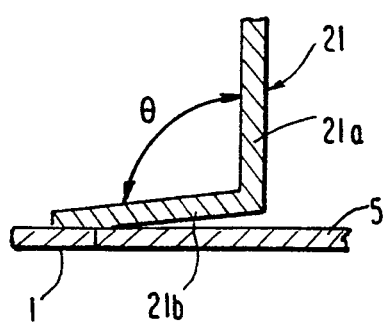
FIG. 3 illustrates the heat transfer member of FIG. 2 making contact with the pressure vessel of FIG. 1.

FIGS. 2 and 3 illustrate the heat transfer member 21, which serves to transfer heat radially outward from the center of the battery to the inner wall of the pressure vessel 5 and thence into the surrounding atmosphere. The heat transfer member 21 is made of an aluminum or any other material having a high coefficient of thermal conductivity. According to a first embodiment of the invention, the heat transfer member 21 includes a circular-shaped fin or body 21a having a cut-out 21d and a plurality of integral flanges 21b, which are separated from one another by a plurality of slits 21c. The flanges 21b extend longitudinally from the body 21a so as to form an "L-shape" from a cross-sectional view of the heat transfer member 21. The flange 21b also forms the outside wall of the compartments 20, which is in thermal contact with the inner wall of the vessel 5.

As illustrated in FIG. 3, the flange 21b forms an obtuse angle $\theta$ with the fin or body 21a of the heat transfer member 21 so as to insure a firm thermal contact between the flange and the inner wall of the vessel when inserted into the pressure vessel 5. When the heat transfer members 21 are inserted into the vessel, the flanges 21b are deflected or bent inward and due to the flexibility of the flanges a radial force or biasing action will be exerted so as to maintain the segments in tight engagement with the inner wall of the vessel. This further ensures that as heat is extracted from within the vessel, the heat is sufficiently transferred to the vessel and subsequently to the surrounding atmosphere.

Figure 8:
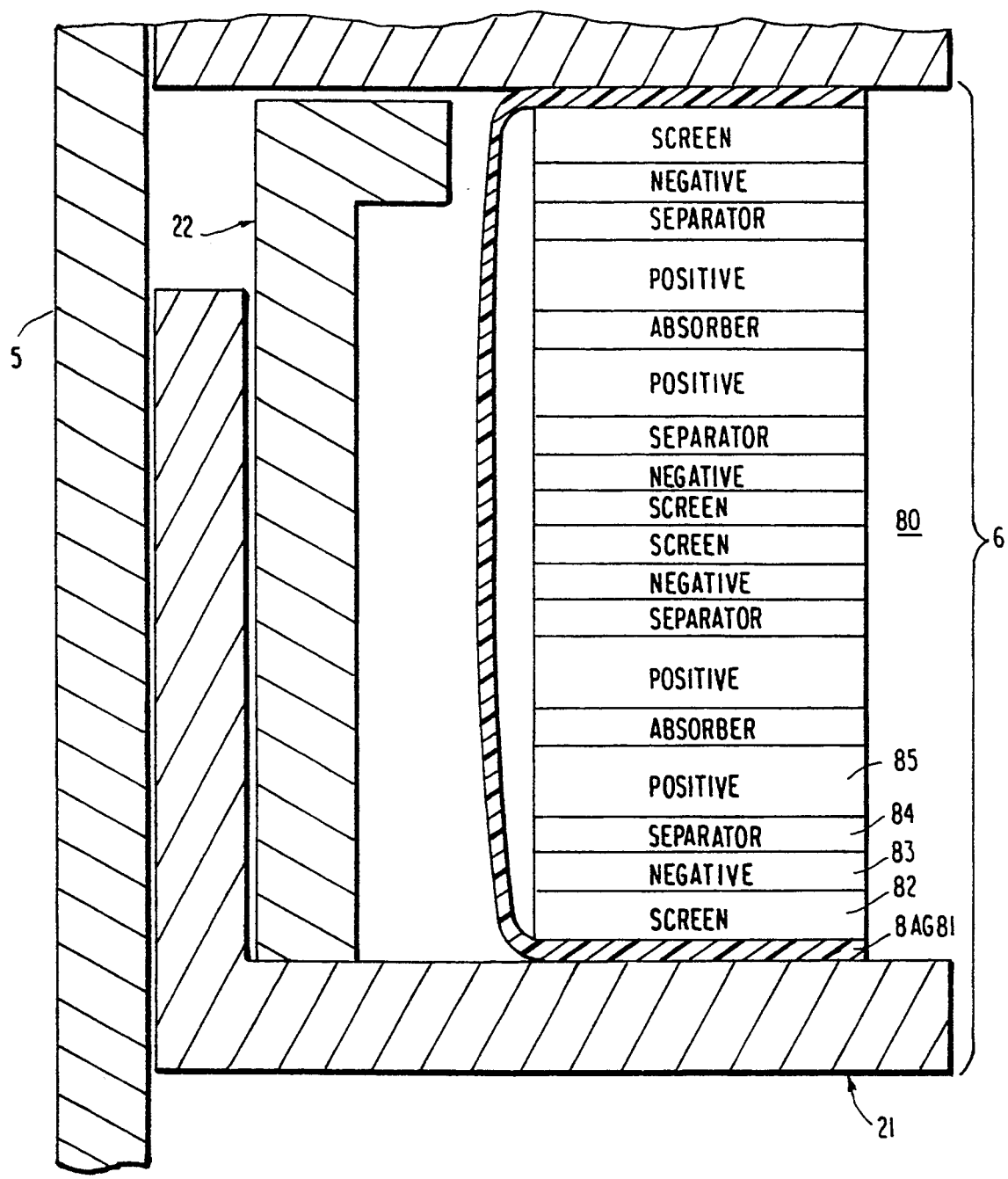
FIG. 8 is an enlarged cross-sectional view showing the relationship between the vessel wall, heat transfer member, individual battery cells, cell spacer, and spacer.
Figure 9:
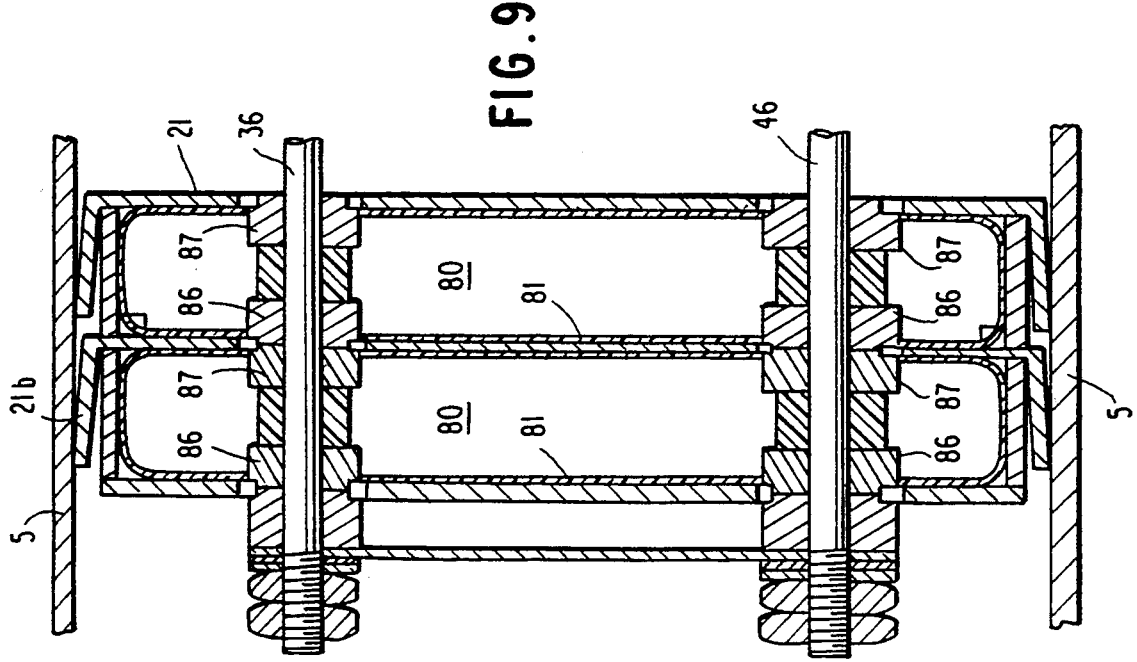
FIG. 9 illustrates a cross-sectional view illustrating the mode of interconnecting adjacent battery cells.

Referring to FIGS. 8 and 9 and as described in commonly assigned patent application Ser. No. 07/711,602, which is herein incorporated by reference, each battery cell 80 is of generally semi-cylindrical or cylindrical shape and contains a repeating pattern of a gas diffusion screen 82, negative electrode 83, separator 84, and positive electrode 85. The arrangement and selection of the materials for these components is conventional and well within the skill of those familiar with this art. Each cell 80 is encased, for example, by a plastic bag 81, which electrically insulates the above-mentioned components from the fins 21 and spacers 22. The outer sides of the bag 81, however, are in intimate thermal contact with the fins 21a of the heat transfer member 21 on both sides of the cell so as to provide good thermal conduction between the cell 80, over its entire surface, and the heat transfer member 21.

Figure 6:
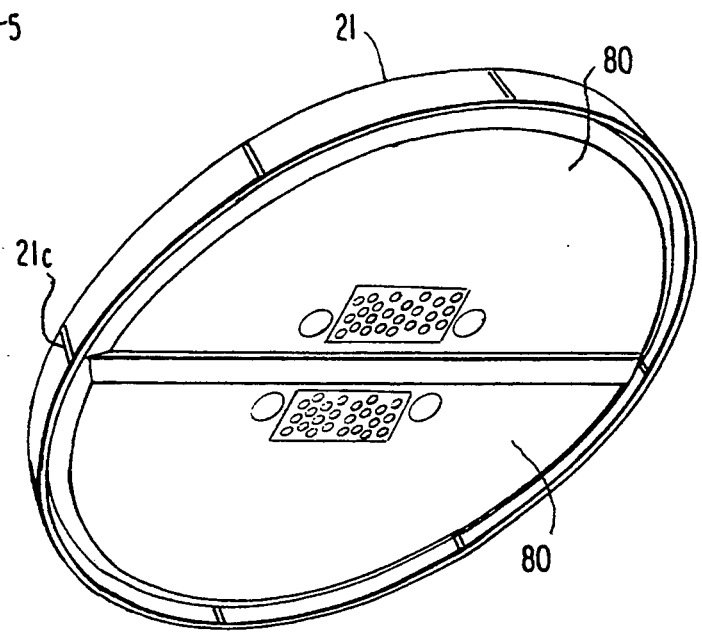
FIG. 6 illustrates two battery cells disposed within a heat transfer member of FIG. 2.

FIG. 6 illustrates the manner in which two generally semi-cylindrical battery cells 80 are situated within a heat transfer member 21, while FIGS. 7 and 8 illustrate the encasing 81 of a battery cells 80 being in intimate thermal contact with adjacent fins 21a of adjacent heat transfer members 21. FIGS. 7 and 8 also illustrate that the length of the flange 21b can vary relative to the width of a battery cell 80 and compartment 20. That is, the maximum length of a flange 21b will allow the end of the flange to come in contact with the adjacent heat transfer member 21. Preferably though, the length of the flange is less than the width of a compartment 20 or battery cell 80 so that the distance between adjacent heat transfer members 21 is determined by the spacers 22 as described in more detail below. However, the length of the flange must be of a certain length to provide a sufficient amount of surface contact between the flange and the inner wall of the vessel 5 so that a sufficient amount of heat can be withdrawn.

Figure 4:
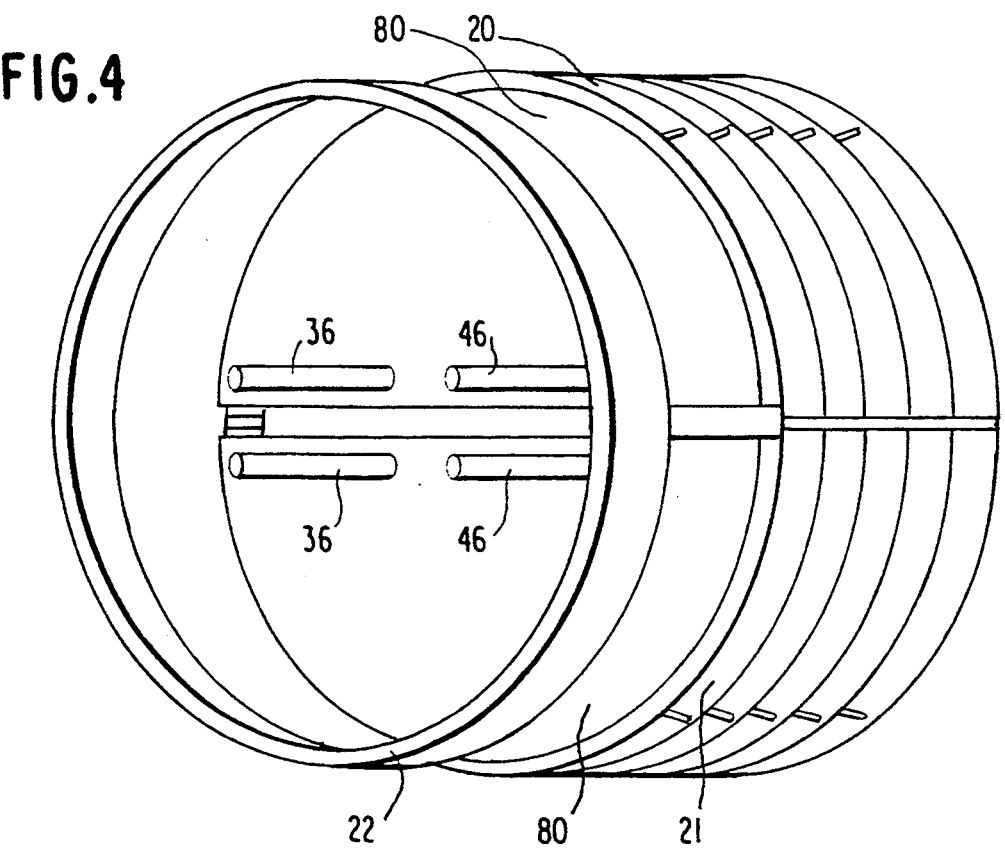
FIG. 4 illustrates a stack of compartments with an internal cell spacer.

Again referring to FIGS. 7 and 8, the heat transfer member 21 of a first compartment is spaced from the heat transfer member 21 of an adjacent compartment by the cell spacer 22, which is generally of a ring-shape, as illustrated best in FIG. 4. First and second sides of the spacer come into contact with the fin or body 21a of adjacent heat transfer members 21. The cell spacers 22 are made of a rigid material (e.g., aluminum) such that the heat transfer members 21 are held stationary and at a relatively constant distance from one another. The spacers 22 also provide for the compartments 20 to remain at a relatively constant compression. As shown in FIGS. 5 and 8, the outer compartment 20 is spaced by an end cell spacer 24, which is composed of a ring-shaped portion 24a, similar to a cell spacer 22, and an integral circular body portion 24b with a cut-out 24c.

Referring now to FIG. 9, each cell 80 has positive electrode terminals 86 and negative electrode terminals 87 which are respectively connected to the positive and negative electrodes 85 and 83 of the cell 80. The battery cells 80 of a compartment 20 can be connected to the battery cells of an adjacent compartment in series or in parallel to obtain the desired voltage output. The connection of adjacent terminals can be through the use of insulated interconnecting rods 36 and 46 which pass through center holes of the terminals 86 and 87, respectively, and through the cut-outs 21d of each of the heat transfer members and the cut-out 24c of the end cell spacer 24. The connection between battery cells and from the battery cells to external positive and negative electrodes 9, 10 can be similar to that which is described in the aforementioned patent application.

Referring back to FIG. 1, first and second weld rings 7 secure the outer end portions 2 and 3, to the center cylindrical portion 4 and also hold the stack of compartments in place so as to prevent any shifting of the stack 6 of the compartments 20 in the axial direction. A wave spring 8 is disposed between the end cell spacer 24 of the stack and the weld ring 7. The wave spring 8 provides a preloading force on the stack of compartments in the axial direction thereof as well as absorbing any vibration or shock.

FIGS. 4 and 5 illustrate a exploded views of a stack 6. Specifically, FIG. 4 illustrates two battery cells 80 placed within a heat transfer member 21. A cell spacer 22 abuts the fin portion 21a of the heat transfer member and around the outer periphery of the two battery cells 80. FIG. 5 illustrates the outer end compartment in which the ring-shaped portion 24b of the end cell spacer 24 is placed against the fin 21a of the heat transfer member 21 and around the outer periphery of the two battery cells 80. The circular body 24a of the end cell spacer 24 rests in contact with the bag 81 of the cell 80. The cut-out 24c allows the rods 36, 46 to pass therethrough.

With the above-discussed battery structure, heat generated within each battery cell 80 is rapidly transferred through the heat transfer members 21 from the fin body 21a to the flanges 21b, and thence, due to the tight contact between the inner wall of the pressure vessel and the flange, to the pressure vessel 5. As a result, the thermal conductivity between the battery cells 80 and the pressure vessel 5 is greatly improved compared with a conventional common pressure vessel type Ni—$H_2$ battery.

Figure 10:
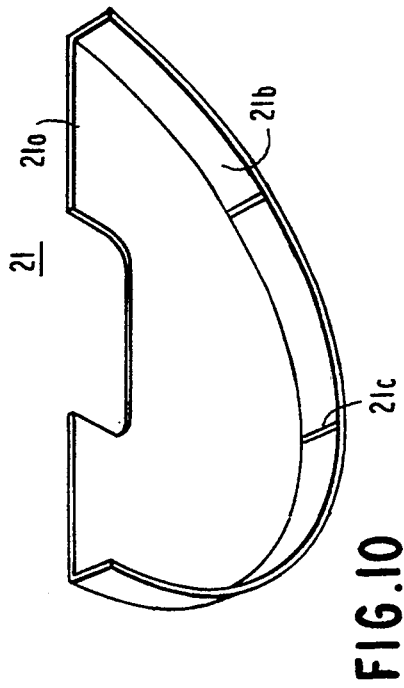
FIG. 10 illustrates a heat transfer member according to a second embodiment of the present invention.

Several alternatives and variations of the above-described battery are possible. For example, as shown in FIG. 10, the heat transfer members 21 can be semi-circular in shape as well as the spacers. In this case, two stacks of compartments, each compartment being generally semi-cylindrical in shape, are assembled together to form a cylindrical shape. That is, each of the stack of compartments has an outer wall having the shape of a cylinder sliced lengthwise along a plane slightly offset from the longitudinal axis of the cylinder so that a small gap is provided between the two cell stacks. The two stacks of compartments once assembled are inserted into the vessel 5. Provisions for maintaining the gap between the two stacks are well known in the art, and a suitable example is illustrated and described in the aforementioned patent application.

Figure 11:
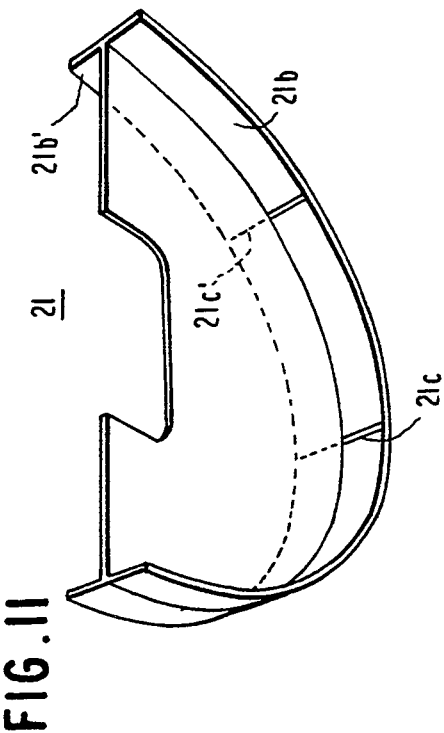
FIG. 11 illustrates a heat transfer member according to a third embodiment of the present invention.

Other embodiments include a heat transfer member of a "T-shape" such as that shown in FIG. 11. Here, the heat transfer member includes a fin body 21a and a plurality of flanges 21b, 21b' extending longtudinally from both sided of the fin 21a. The flanges 21b, 21b' are separated by a plurality of slits 21c, 21c'.

There has thus been shown and described a novel Ni—$H_2$ battery having improved thermal properties which fulfills all the objects and advantages sought therefor. Many changes, modifications, variations and other uses and applications of the subject invention will, however, become apparent to those skilled in the art after considering the specification and the accompanying drawings which disclose preferred embodiments therefor. All such changes, modifications, variations and other uses and applications which do not depart from the spirit and scope of the invention are deemed to be covered by the invention which is limited only by the claims which follow.

What is claimed is:

1. A battery comprising:
   a pressure vessel; and
   a plurality of compartments disposed in side-by-side relation, each of said compartments comprising:
   a heat transfer member having a fin portion and a flange portion extending longitudinally from said fin portion, said flange being in thermal contact with an inner wall of said pressure vessel;
   a plurality of battery cells, at least one battery cell being disposed in each of said compartments and in thermal contact with adjacent fin portions of said heat transfer members; and
   a cell spacer for maintaining adjacent heat transfer members of adjacent compartments a predetermined distance from one another.

2. A battery as defined in claim 1, wherein said cell spacer is ring-shaped.

3. A battery as defined in claim 1, further comprising first and second weld rings and a wave spring, and wherein a first outer one of said compartments comprises an end cell spacer, said first weld ring being in contact with a heat transfer member of a second outer compartment, and said wave spring being in contact with said end cell spacer and said first weld ring so as to provide a preloading force on said stack of compartments.

4. A battery as defined in claim 1, wherein the length of said flange portion of said heat transfer member is less than the width of said battery cell.

5. A battery as defined in claim 1, wherein the length of said flange portion of said heat transfer member is the same as the width of said battery cell.

6. A battery as defined in claim 1, wherein said flange portion forms an obtuse angle with said fin portion.

* * * * *